United States Patent
Naito et al.

(10) Patent No.: US 7,423,862 B2
(45) Date of Patent: Sep. 9, 2008

(54) SOLID ELECTROLYTIC CAPACITOR ELEMENT, SOLID ELECTROLYTIC CAPACITOR AND PRODUCTION METHOD THEREOF

(75) Inventors: Kazumi Naito, Chiba (JP); Katutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 300 days.

(21) Appl. No.: 11/311,376

(22) Filed: Dec. 20, 2005

(65) Prior Publication Data

US 2006/0158830 A1 Jul. 20, 2006

Related U.S. Application Data

(60) Provisional application No. 60/640,257, filed on Jan. 3, 2005.

(30) Foreign Application Priority Data

Dec. 24, 2004 (JP) .............................. 2004-373651

(51) Int. Cl.
*H01G 9/00* (2006.01)

(52) U.S. Cl. ........................ 361/523; 361/525; 361/528; 361/529; 361/516; 361/519; 29/25.01; 29/25.03

(58) Field of Classification Search ......... 361/523–534, 361/540, 516–519; 29/25.01, 25.03
See application file for complete search history.

(56) References Cited

U.S. PATENT DOCUMENTS

| 5,377,073 | A | * | 12/1994 | Fukaumi et al. | ............. | 361/540 |
| 5,428,500 | A | * | 6/1995 | Nishiyama et al. | ........... | 361/525 |
| 6,751,833 | B2 | * | 6/2004 | Saito et al. | .................. | 29/25.42 |
| 6,865,069 | B2 | | 3/2005 | Kabe et al. | | |
| 7,122,063 | B2 | * | 10/2006 | Naito et al. | ................. | 29/25.03 |
| 2004/0223291 | A1 | | 11/2004 | Naito et al. | | |

FOREIGN PATENT DOCUMENTS

| JP | 2-58818 | 2/1990 |
| JP | 2-238613 | 9/1990 |
| JP | 2-249221 | 10/1990 |
| JP | 5-90081 | 4/1993 |
| WO | WO 03/032344 | 4/2003 |

* cited by examiner

*Primary Examiner*—Nguyen T Ha
(74) *Attorney, Agent, or Firm*—Sughrue Mion, PLLC

(57) ABSTRACT

The invention relates to a process for producing a solid electrolytic capacitor element, comprising forming a semiconductor layer containing a conductive polymer on a conductor having a dielectric layer on its surface. By using the solid electrolytic capacitor element of the invention prepared by forming a semiconductor layer on the conductor having a dielectric layer on its surface by an electrification method after the conductor is impregnated with a dopant, a solid electrolytic capacitor having a favorable ESR value can be fabricated.

13 Claims, No Drawings

SOLID ELECTROLYTIC CAPACITOR ELEMENT, SOLID ELECTROLYTIC CAPACITOR AND PRODUCTION METHOD THEREOF

CROSS-REFERENCE TO RELATED APPLICATIONS

This is an application filed pursuant to 35 U.S.C. Section 111(a) with claiming the benefit of U.S. provisional application Ser. No. 60/640,257 filed Jan. 3, 2005 under the provision of 35 U.S.C. 111(b), pursuant to 35 U.S.C. Section 119(e)(1).

TECHNICAL FIELD

The present invention relates to a process for producing a high-capacitance solid electrolytic capacitor element having a low equivalent series resistance (ESR) value.

BACKGROUND ART

As a capacitor having a high capacitance and a low ESR used in various electronic equipments, an aluminum solid electrolytic capacitor and a tantalum solid electrolytic capacitor have been known.

A solid electrolytic capacitor has an aluminum foil having minute pores on a surface layer thereof or a sintered body of tantalum powder having minute pores inside as one electrode (conductor), and is produced by sealing a solid electrolytic capacitor element constituted by a dielectric layer formed on the surface layer of the electrode, another electrode (a semiconductor, in general) provided on the dielectric layer, and an electrode layer laminated on the another electrode.

An organic material and an inorganic material are used as the semiconductor layer, and a conductive polymer is preferably used in consideration of the heat resistance and the low ESR characteristics of the capacitor produced. The conductive polymer is such a polymer having a high conductivity of from $10^{-2}$ to $10^3$ S·cm$^{-1}$, and a high conductivity is exhibited by adding an electron donative compound called as a dopant to a polymer having a planar conjugated double bond (in general, an insulating material or a polymer exhibiting an extremely low conductivity). Specific examples of the method for forming a conductive polymer as the semiconductor layer include such a method that a monomer capable of becoming a conductive polymer is polymerized by feeding a suitable oxidizing agent or electrons in the presence of a dopant in the minute pores of the conductor. The dopant is incorporated upon polymerization of the monomer to obtain a conductive polymer.

U.S. Pat. No. 1,945,358 and U.S. Pat. No. 2,811,648 disclose a method of forming a semiconductor layer by forming a chemical polymerization layer by using an oxidizing agent and then laminating an electrolytic polymerization layer by an electrification method.

DISCLOSURE OF THE INVENTION

Electronic equipments in recent years are in such a design trend that the working voltage is lowered with high electric consumption to apply a large electric current at once, and therefore, as a solid electrolytic capacitor used therein a high-capacitance capacitor with a lower ESR value is demanded. However, a conductor required in a high-capacitance capacitor is necessarily increased in internal surface area by diminishing each size of the minute pores in the conductor assuming that the volume thereof is constant, and as a result, such problems are brought about that the semiconductor layer formed on the dielectric layer on the conductor is insufficiently impregnated, and the semiconductor layer produced has a high resistance. In other words, there is a limitation in increasing the capacitance and decreasing the ESR of the conventional high-capacitance capacitor used at a high electric consumption and a low voltage.

Therefore, an object of the invention is to provide a process for producing a high-capacitance solid electrolytic capacitor having a favorable ESR value.

As a result of earnest investigations for solving the problems made by the inventors, it has been found that a semiconductor layer can be formed to a desired extent, with a sufficient amount of dopant being supplied to the conductor, by forming a semiconductor layer through an electrification on the conductor impregnated with a dopant after forming a dielectric layer, whereby a high-capacitance solid electrolytic capacitor having a lower ESR value can be obtained, and thus the invention has been completed.

Accordingly, the invention provides a process for producing a solid electrolytic capacitor element, and a solid electrolytic capacitor produced by using the process, which are shown below.

1. A process for producing a solid electrolytic capacitor element, comprising forming a semiconductor layer containing a conductive polymer on a conductor having a dielectric layer on its surface, wherein the semiconductor layer is formed on the conductor having a dielectric layer on its surface by an electrification method after the conductor is impregnated with a dopant.

2. The process for producing a solid electrolytic capacitor element described in 1 above, wherein the dopant is an electron donating compound providing, upon doping through electrolytic polymerization, a conductive polymer having a conductivity of from $10^{-1}$ to $10^3$ S·cm$^{-1}$.

3. The process for producing a solid electrolytic capacitor element described in 1 or 2 above, wherein the dopant is at least one selected from a compound having a sulfonic acid group and a boron compound having a carboxylic acid coordinated to a boron atom.

4. The process for producing a solid electrolytic capacitor element described in 1 above, wherein the conductor is a metal containing as a major component at least one selected from tantalum, niobium, titanium and aluminum, niobium oxide, or a mixture of two or more thereof.

5. The process for producing a solid electrolytic capacitor element described in 1 above, wherein the semiconductor layer is a layer comprising at least one selected from a semiconductor containing as a major component a conductive polymer obtained by doping a polymer containing a repeating unit represented by formula (1) or (2) with a dopant:

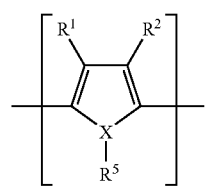

(1)

-continued

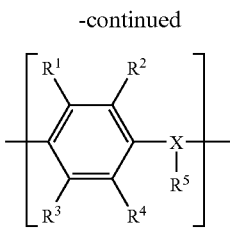

(2)

(wherein $R^1$ to $R^4$ each independently represent a hydrogen atom, an alkyl group having from 1 to 6 carbon atoms or an alkoxy group having from 1 to 6 carbon atoms; X represents an oxygen atom, a sulfur atom or a nitrogen atom; and $R^5$, which exists only when X is a nitrogen atom, represents a hydrogen atom or an alkyl group having from 1 to 6 carbon atoms, provided that $R^1$ and $R^2$, and $R^3$ and $R^4$ each may be bonded to form a ring).

6. The process for producing a solid electrolytic capacitor element described in 5 above, wherein the polymer containing a repeating unit represented by formula (1) is a polymer containing a structural unit represented by formula (3) as a repeating unit:

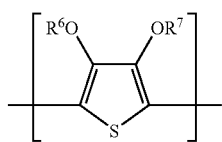

(3)

(wherein $R^6$ and $R^7$ each independently represent a hydrogen atom, a linear or branched and saturated or unsaturated alkyl group having from 1 to 6 carbon atoms, or a substituent having at least one 5- to 7-membered saturated hydrocarbon ring structure containing two oxygen atoms formed by bonding the alkyl groups at an arbitrary position, provided that the ring structure encompasses a structure having a vinylene bond, which may be substituted, and a phenylene structure, which may be substituted).

7. The process for producing a solid electrolytic capacitor element described in 5 above, wherein the conductive polymer is selected from polyaniline, polyoxyphenylene, polyphenylene sulfide, polythiophene, polyfuran, polypyrrole, polymethylpyrrole and substituted derivatives and copolymers thereof.

8. The process for producing a solid electrolytic capacitor element described in 7 above, wherein the conductive polymer is poly(3,4-ethylenedioxythiophene).

9. The process for producing a solid electrolytic capacitor element described in 5 above, wherein the semiconductor has a conductivity in a range of from $10^{-2}$ to $10^3$ S·cm$^{-1}$.

10. A solid electrolytic capacitor element produced by the production process described in any one of 1 to 9 above.

11. A solid electrolytic capacitor obtained by sealing the solid electrolytic capacitor element described in 10 above.

12. An electronic circuit comprising the solid electrolytic capacitor described in 11 above used therein.

13. An electronic equipment comprising the solid electrolytic capacitor described in 11 above mounted therein.

The invention provides a process for producing a solid electrolytic capacitor element in which a semiconductor layer is formed on a conductor by an electrification method, which conductor has been impregnated with a dopant after forming a dielectric layer, and a solid electrolytic capacitor obtained by sealing a capacitor element obtained by the process, and according to the invention, a solid electrolytic capacitor having a low initial ESR value and a high capacitance can be produced.

BEST MODE FOR CARRYING OUT THE INVENTION

Exemplary embodiments of the process for producing a solid electrolytic capacitor element and the solid electrolytic capacitor using the solid electrolytic capacitor element according to the invention will be described.

Examples of the conductor used in the invention include a metal containing as a major component (accounting for 50 mass % or more) at least one selected from tantalum, niobium, titanium and aluminum, niobium monooxide, or a mixture of two or more thereof. Here, the metal may be an alloy.

In the case where a metal is used as the conductor, the metal may be used after subjecting a part of the metal to at least one treatment selected from carbonization, phosphidation, boronization, nitridation and sulfurization.

The shape of the conductor is not particularly limited and may be in a foil form, a plate form or a bar form. A conductor can be obtained by molding or molding and sintering a powdery conductor material or by the like manner. Alternatively, the conductor may be prepared by attaching a powdery conductor material onto a part of a metal foil or a metal plate and sintering it. The surface of the conductor may be treated by etching or the like to provide minute pores. In the above molded conductor or the above sintered conductor, minute pores can be provided inside after molding or sintering, by appropriately selecting the pressure upon molding.

A lead may be connected directly to the conductor, and in the case where the conductor is a molded or sintered body, it is possible to mold a portion of a separately prepared lead wire (or a lead foil) together with the conductor upon the molding step, and the other portion of the lead wire (or the lead foil) left outside the molded product is used as a leading line of one of the electrodes of the solid electrolytic capacitor element.

Alternatively, a part of the conductor may be left without forming a semiconductor layer thereon and may serve as an anode. For the purpose of preventing the semiconductor layer from crawling up, an insulating resin may be attached around like a head band and cured on the boundary between the anode part and the part where the semiconductor layer is formed.

Preferred examples of the conductor of the invention include tantalum powder, niobium powder, alloy powder containing tantalum as a major component, alloy powder containing niobium as a major component, a sintered body having a large number of minute pores inside formed by molding and sintering such powder as niobium monooxide powder, and an aluminum foil having an etched surface.

In a case where a sintered body is prepared by using a powder having a small particle diameter, a sintered body having a large specific surface area per mass can be obtained. In the invention, the sintered body can have a high specific surface area such that the CV value (which is a product of the capacitance and the formation voltage described later) is 80,000 μFV/g or more in case of tantalum powder or 150,000 μFV/g or more in case of niobium powder or niobium monooxide powder with a mass of 40 mg or more. The solid electrolytic capacitor thus obtained is preferable in that the capacitor has a small volume and a large capacitance.

Examples of the dielectric layer formed on the surface of the conductor of the invention include a dielectric layer containing as a major component at least one selected from metallic oxides including $Ta_2O_5$, $Al_2O_3$, $TiO_2$ and $Nb_2O_5$. The dielectric layer is formed by immersing the conductor in an electrolytic solution containing an organic acid, such as acetic acid, adipic acid and benzoic acid, an organic acid salt, a mineral acid, such as phosphoric acid, sulfuric acid, boric acid and silicic acid, or a mineral acid salt, and applying a voltage thereto with the conductor as an anode and a cathode plate provided separately in the electrolytic solution (the operation is referred to as "chemical conversion (formation)"). The chemical conversion temperature, the chemical conversion time, the electric current density upon chemical conversion, and the like are determined in consideration of the species, the mass and the size of the conductor, the capacitance and the operation voltage of the target solid electrolytic capacitor element, and the like. The chemical conversion temperature is generally from room temperature to 100° C. or less, and the chemical conversion time is generally from several hours to several days. After completing the chemical conversion, the electrolytic solution attached in the conductor is washed out with water or a suitable organic solvent, such as an alcohol, followed by drying.

It is important in the invention that the conductor is impregnated with a dopant to make the dopant contained in the minute pores inside the conductor before forming the semiconductor layer by an electrification method on the conductor having the dielectric layer formed thereon. In the case where the conductor having minute pores that are finer than those in the conventional one is impregnated with a dopant after forming the dielectric layer, the semiconductor layer can be formed uniformly into a deep part of the minute pores, and a sufficient amount of the dopant can be fed to the semiconductor layer, while the reasons thereof are not clear. A solid electrolytic capacitor thus produced has a low ESR and a large capacitance, as compared with a conventional capacitor having a conductor of the same volume.

Conventionally known dopants are used as the dopant impregnated in the conductor, and in particular, such a dopant is preferred that includes pyrrole or 3,4-ethylenedioxythiophene as a representative monomer and provides a conductive polymer having a conductivity of from $10^{-1}$ to $10^3$ S·cm$^{-1}$ through doping upon electrolytic polymerization of the monomer. Examples of a dopant include a compound having a sulfonic acid group and a boron compound having a carboxylic acid coordinated to a boron atom. Representative examples of the compounds include a sulfonic acid having an aryl group such as benzenesulfonic acid, toluenesulfonic acid, naphthalenesulfonic acid, anthracenesulfonic acid, benzoquinonesulfonic acid, naphthoquinonesulfonic acid and anthraquinonesulfonic acid, a sulfonic acid having an alkyl group such as butylsulfonic acid, hexylsulfonic acid and cyclohexylsulfonic acid, various kinds of oligomer or polymer (polymerization degree of from 2 to 200) sulfonic acid such as polyvinylsulfonic acid, and a salt of these sulfonic acids (such as an ammonium salt, an alkali metal salt, an alkaline earth metal salt, a salt of a tratsistion metal such as iron, and other metallic salts). These compounds may have a substituent and may have plural sulfonic acid groups. Examples thereof include 2,6-naphthalenedisulfonic acid and 1,2-ethanedisulfonic acid. Examples of the boron compound include ammonium borodisalicylate and a hydrate thereof, and boro-1,2-carboxybenzene ammonium. As the dopant, multiple kinds of dopants may be used in combination.

One example of the method for impregnating the conductor with the dopant is such a method that the conductor is immersed in a solution obtained by dissolving or partially suspending the dopant in at least one solvent selected from water and an organic solvent, and then after withdrawing the conductor from the solution, the solvent is dried and evaporated. The solvent used may remain partially in the conductor. In the case where the dopant is in a liquid state at ordinary temperature, the conductor may be directly immersed in and be withdrawn from the dopant without using a solvent. After withdrawing, the conductor may be dried at a temperature slightly higher than ordinary temperature, or the surface of the conductor may be rinsed with a suitable solvent to remove the dopant on the surface of the conductor, and the semiconductor layer is formed in the next step. It is preferred that the impregnation of the conductor with the dopant and the removal of the solvent are carried out several times because the dopant can be uniformly introduced into the deep part of the conductor.

Follow-up chemical conversion may be carried out again in order to restore minute defects in the dielectric layer which are generated through impregnation with the dopant. The follow-up chemical conversion may be carried out by using the reagents used in the aforementioned chemical conversion in the similar manner as the aforementioned chemical conversion. The same dopant as the dopant used in the impregnation of the conductor may be used as a reagent for the follow-up chemical conversion. By using the dopant in the follow-up chemical conversion, there are some cases where the dopant can be suppressed from exuding from the conductor upon chemical conversion.

Examples of the other electrode formed on the dielectric layer of the conductor impregnated with the dopant include at least one organic semiconductor selected from the conductive polymers described later. The conductive polymer may be used as the first layer, and at least one compound selected from the other organic semiconductors and inorganic semiconductors may be contained as the second layer, alternatively the former and the latter may be contained as a mixture.

Specific examples of the organic semiconductor include an organic semiconductor containing a benzopyrroline tetramer and chloranil, an organic semiconductor containing tetrathiotetracene as a major component, an organic semiconductor containing tetracyanoquinodimethane as a major component, and an organic semiconductor containing as a major component a conductive polymer obtained by doping a polymer containing a repeating unit represented by formula (1) or (2) with a dopant:

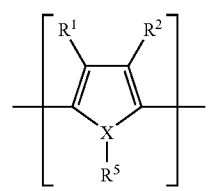

(1)

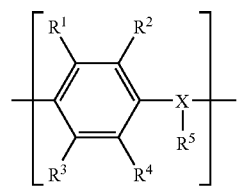

(2)

In the formulae (1) and (2), $R^1$ to $R^4$ each independently represent a hydrogen atom, an alkyl group having from 1 to 6 carbon atoms or an alkoxy group having from 1 to 6 carbon atoms; X represents an oxygen atom, a sulfur atom or a nitrogen atom; and $R^5$, which exists only when X is a nitrogen atom, represents a hydrogen atom or an alkyl group having from 1 to 6 carbon atoms, provided that $R^1$ and $R^2$, and $R^3$ and $R^4$ each may be bonded to form a ring.

Preferred examples of the polymer containing the repeating unit represented by the general formula (1) include a polymer containing a structural unit represented by the formula (3) as a repeating unit:

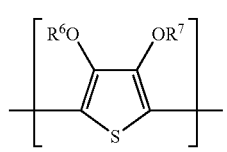

(3)

In the formula, $R^6$ and $R^7$ each independently represent a hydrogen atom, a linear or branched and saturated or unsaturated alkyl group having from 1 to 6 carbon atoms, or a substituent having at least one 5- to 7-membered saturated hydrocarbon ring structure containing two oxygen atoms formed by bonding the alkyl groups at an arbitrary position. The ring structure encompasses a structure having a vinylene bond, which may be substituted, and a phenylene structure, which may be substituted.

The conductive polymer having the chemical structure is charged and doped with a dopant. The dopant is not particularly limited, and the same dopant as those impregnated in the conductor before forming the semiconductor layer may be used.

The dopants used in the invention are described as uncharged compounds, but upon actually functioning as a dopant, they are in a partially charged state or ionized (mainly anions), and therefore those forms are also encompassed in the scope of dopants (for example, benzenesulfonic acid anion is included in the case of benzenesulfonic acid).

Examples of the polymer containing a repeating unit represented by the formulae (1) to (3) include polyaniline, polyoxyphenylene, polyphenylene sulfide, polythiophene, polyfuran, polypyrrole, polymethylpyrrole and substituted derivatives and copolymers thereof. Among these, polypyrrole, polythiophene and substituted derivatives thereof (such as poly(3,4-ethylenedioxythiophene)) are preferred.

The semiconductor layer is formed in the form of laminae by chemical polymerization method (such as a solution reaction, a gas phase reaction, a solid-liquid reaction and a polymerization method using a combination thereof), an electrolytic polymerization method and a combination thereof. It is preferable to form least the first layer (the layer which is first formed) by electrolytic polymerization method, since the resulting capacitor has an initial ESR value lower than those produced by the other methods, and the reason for such a low ESR seems to be that conductive polymer chain has no branches or that the thickness of the semiconductor layer on the outer surface of the conductor is uniform.

Specific examples of the inorganic semiconductor include at least one compound selected from molybdenum dioxide, tungsten dioxide, lead dioxide and manganese dioxide.

It is preferable to use a compound having a conductivity in a range of from $10^{-2}$ to $10^3$ S·cm$^{-1}$ as the organic conductor and the inorganic conductor, since the solid electrolytic capacitor thus produced has a small ESR value.

The conductive polymer as the first layer of the semiconductor layer (the entire semiconductor layer when no other layer exists) is formed by an electrification method called electrolytic polymerization. As the electrolytic polymerization, such a method has been known that an external electrode disposed in the vicinity of the outer periphery of the conductor is used as an anode. However, instead of using such a method, it is preferable to apply electric current by using an anode part or an anode lead of the conductor as an anode and using a cathode plate disposed in the solution for forming the semiconductor layer having the conductor immersed therein as a cathode, so that the polymerization begins from the interior of the conductor and the polymerization can proceed uniformly even in the conductor having minute pores, whereby the semiconductor is favorably deposited.

In the invention, follow-up chemical conversion may be carried out again in order to restore minute defects in the dielectric layer formed through formation of the semiconductor layer. The application of electricity for the purpose of forming a semiconductor layer and the follow-up chemical conversion may be repeated several times, and the electrification conditions may be changed when the electrification is repeated. In general, upon terminating the application of electricity, the conductor is withdrawn from the solution for forming the semiconductor layer and then rinsed and washed, the operation including application of electricity, termination of application of electricity, rinsing and drying may be repeated several times, and then the follow-up chemical conversion is effected. While the reason therefor is not clear, there are some cases where the mass of the semiconductor layer is increased by repeatedly carrying out the operation including application of electricity, termination of application of electricity, rinsing and drying as compared with a case where electricity is continuously applied, provided that the total time of application of electricity is the same.

The follow-up chemical conversion may be carried out in the similar manner as the method of forming the dielectric layer by chemical conversion described above. The voltage of the follow-up chemical conversion is lower than the voltage of the chemical conversion.

As a pre-treatment for improving the formation ratio of the semiconductor layer, minute projections may be formed as minute electrical defects on the dielectric layer formed on the surface of the conductor layer, and then the semiconductor layer is formed by the method of the invention.

In the case where the formation of the semiconductor layer is completed by process divided into several times, the follow-up chemical conversion may be carried out in arbitrary times at arbitrary timing during formation process of the semiconductor layer, and it is preferred that the follow-up chemical conversion is carried out after finally completing the formation of the semiconductor layer.

In the invention, an electrode layer is provided on the semiconductor layer formed by the aforementioned method. The electrode layer may be formed, for example, by solidification of conductive paste, plating, metallic vapor deposition, adhesion of aheat-resistant conductive resin film, and the like. Preferred examples of the conductive paste include silver paste, copper paste, aluminum paste, carbon paste and nickel paste, and one kind or two or more kinds thereof may be used. In the case where two or more kinds thereof are used, they may be mixed or may be laminated as separate layers. After applying the conductive paste, it is solidified by allowing to stand in the air or by heating.

The major components of the conductive paste include a resin and conductive powder of ametal and the like, and a solvent for dissolving the resin and a curing agent of the resin may be used as required. The solvent is evaporated upon solidification by heating. Examples of the resin include known resins, such as an alkyd resin, an acrylic resin, an epoxy resin, a phenol resin, an imide resin, a fluorine resin, an ester resin, an imideamide resin, an amide resin and a styrene resin. Examples of the conductive powder include powder of silver, copper, aluminum, gold, carbon, nickel and an alloy containing these metals as a major component, and mixed powder thereof. The conductive powder is generalry contained in an amount of from 40 to 97% by mass. If the amount is less than 40% by mass, the conductive paste produced is low in conductivity, which is not preferred. Also, if it exceeds 97% by mass, the conductive paste is inferior in adhesiveness, which is not preferred. The conductive paste may be mixture of powder of the conductive polymer or the metallic oxide used in the aforementioned formation of the semiconductor layer.

Examples of the plating include nickel plating, copper plating, silver plating, gold plating and aluminum plating. Examples of the metal vapor-deposited include aluminum, nickel, copper, gold and silver.

Specifically, for example, carbon paste and silver paste are laminated sequentially on the resulting semiconductor layer to form the electrode layer. Thus, a solid electrolytic capacitor element is produced by forming on the conductor, laminates up to the electrode layer.

The solid electrolytic capacitor element of the invention having the aforementioned constitution can be made a solid electrolytic capacitor product for various purposes by jacketing the element with a resin mold, a resin case, a metallic outer package, dipping with a resin or a laminate film. Among these, a chip solid electrolytic capacitor packaged with a resin mold is particularly preferred, since reduction in size and cost is easy.

The resin mold outer package will be specifically described. The capacitor of the invention has a structure in which a part of the electrode layer of the capacitor element is disposed on one terminal of a separately prepared lead frame (having a pair of terminals which are disposed opposely to each other with a gap therebetween), and a part of the conductor is disposed on the other terminal of the lead frame. In the case where the conductor has a structure having an anode lead, the end of the anode lead may be cut to thereby adjust the dimension. Subsequently, each of the cathode and the anode of the capacitor element is electrically and mechanically bonded through solidification of conductive paste or through welding. The assembly is then sealed with a resin while a part of the terminals of the lead frame is left unsealed, and the lead frame is cut and bent at a prescribed position outside the resin sealing, to thereby produce the capacitor chip. (Here, only the cutting operation is sufficient, in the case where the lead frame is present on the lower surface of the resin sealing and the assembly is sealed with the lower surface or the lower surface and side surface of the lead frame left unsealed).

As described above, the lead frame is finally cut to serve as an external terminal of the capacitor. The shape thereof is in a foil or plate form, and the material thereof is iron, copper, aluminum or an alloy containing these metals as a major component. The lead frame may have at least one plating layer of solder, tin, titanium, gold, silver, nickel, palladium, copper or the like on a partial or entire surface thereof.

The lead frame maybe subjected to various kinds of plating before or after the cutting/bending process. The lead frame may be plated before disposing the solid electrolytic capacitor element thereon, and then again plated at an arbitrary occasion after sealing.

The lead frame has a pair of terminals disposed opposedly to each other and with the gap between the terminals, the anode part and the electrode layer of the capacitor element are insulated from each other.

Examples of the resin used as the resin molded package include known resins used for sealing a capacitor, such as an epoxy resin, a phenol resin, an alkyd resin, an ester resin and an allylester resin. As these resins, a commercially available low stress resin (for example, a resin having a thermal expansion coefficient $\alpha$ of $3 \times 10^{-5}$ per $^\circ$ C. or less, which generally contains a filler in an amount of 70% by volume or more) is preferably used since generation of sealing stress to the capacitor element at the time of sealing can be alleviated. Also, a transfer machine is preferably used for sealing with resin.

The solid electrolytic capacitor thus produced may be subjected to an aging treatment for the purpose of repairing thermal and/or physical defects of the dielectric layer which have been generated upon forming the electrode layer or providing the outer package.

The aging treatment may be carried out by applying a prescribed voltage (which is generally twice the rated voltage or less) to the capacitor. The period of time and the temperature of the aging treatment vary depending on the species, the capacity and the rated voltage of the capacitor, and are determined by conducting experiments in advance. However, in general, the aging treatment is carried out for a period of time of from several minutes to several days at a temperature of 300$^\circ$ C. or less in consideration of thermal deterioration of the voltage application device.

The aging treatment may be carried out in any atmosphere of reduced pressure, normal pressure and increased pressure. The aging treatment may be carried out in such an atmosphere as in the air or in a gas such as argon, nitrogen and helium, and preferably in water vapor. There are some cases where stabilization of the dielectric layer proceeds when the aging treatment is carried out in an atmosphere containing water vapor and then carried out in the air or a gas such as argon, nitrogen and helium. It is also possible to carry out the aforementioned aging treatment after returning the temperature to room temperature after feeding water vapor or after allowing the capacitor to stand at a high temperature of from 150 to 250$^\circ$ C. for a period of from several minutes to several hours to thereby remove extra water content after feeding water vapor. One example of the method of feeding water vapor is a method of feeding water vapor from a water bath disposed in an aging furnace through heating.

The method of applying a voltage may be designed in such a manner that passes an arbitrary electric current, such as a direct current, an alternating current having an arbitrary waveform, and an alternating current and a pulse current having a direct current overlapped thereto. It is possible to stop the voltage application during the aging treatment and then resume the voltage application. The aging treatment may be carried out by increasing the voltage sequentially from a low voltage to a high voltage.

The solid electrolytic capacitor produced according to the invention may be preferably used in a circuit using a high-capacitance capacitor such as a central processing circuit and an electric power supply circuit, and these circuits may be utilized in various digital equipments, such as a personal computer, a server computer, a camera, a game machine, a DVD player/recorder, an AV equipment and a cellular phone, and an electronic equipment such as various kinds of electric power sources. The solid electrolytic capacitor produced according to the invention has a large capacitance and a favorable initial ESR value, and by using the capacitor, an electronic circuit and an electronic device with high reliability which exert small heat generation upon applying a large electric current can be obtained.

EXAMPLES

Specific examples of the invention will be described in more detail below, but the invention is not limited to the following examples.

Examples 1 to 3

Niobium primary powder (average particle diameter: 0.30 µm) obtained by pulverizing a niobium ingot utilizing hydrogen brittleness thereof was granulated to obtain niobium powder having an average particle diameter of 130 µm (containing 105,000 ppm of oxygen by spontaneous oxidation since the niobium powder was fine powder). It was allowed to stand in a nitrogen atmosphere at 450° C. and then allowed to stand in argon at 700° C. to obtain partially nitride niobium powder having a nitrogen content of 8,000 ppm (CV value: 297,000 µF·V/g). The niobium powder was molded along with a niobium wire having a diameter of 0.48 mm, which were then sintered at 1270° C., to produce plural sintered bodies (conductors) having a dimension of 4.1×3.5×1.0 mm (having a mass of 0.06 g per body, with a niobium lead wire present in a length of 3.7 mm inside the sintered body and in a length of 8 mm outside the sintered body).

Subsequently, the sintered body was subjected to chemical conversion in a 0.5% by mass phosphoric acid aqueous solution at 70° C. and 20 V for 8 hours to form a dielectric layer containing diniobium pentoxide as a major component on the surface of the sintered body and a part of the lead wire. The sintered body was immersed in an alcohol solution having the compounds shown in Table 1 as a dopant dissolved therein, and then dried to remove the alcohol. The operation of impregnating the dopant and removing the alcohol was repeated 10 times. Thereafter, the surface of the sintered body was rinsed with an alcohol and then dried.

The sintered body was further immersed in a bath (a tantalum foil was attached to the bath itself for functioning as an external electrode) having therein a separately prepared mixed solution of 30% by mass ethylene glycol containing a slight amount of pyrrole monomer and 4% anthraquinone-2-sulfonic acid dissolved therein and water, and electrolytic polymerization was carried out at 100 µA for 60 minutes with the lead wire of the sintered body as an anode and the external electrode as a cathode. The sintered body was withdrawn from the bath, and after rinsing with water, rinsing with an alcohol and drying, the sintered body was subjected to follow-up chemical conversion in a 1% by mass phosphoric acid aqueous solution at 70° C. and 13 V for 15 minutes. The electrolytic polymerization and the follow-up chemical conversion were repeated 6 times to form a semiconductor layer containing polypyrrole on the dielectric layer.

Subsequently, carbon paste was laminated on the semiconductor layer and dried to provide a carbon layer, and silver paste containing as a major component 90% by mass of silver powder and 10% by mass of an acrylic resin was laminated thereon and dried to form an electrode layer, so as to produce plural solid electrolytic capacitor elements. The solid electrolytic capacitor element was disposed on a lead frame (made of a copper alloy having 10 µm of semigloss nickel plating on both surfaces), which was separately prepared as an external terminal, in such a manner that the lead wire of the sintered body and the silver paste surface on the electrode layer were put on both tops of the lead frame, respectively. The former was electrically and mechanically connected by spot welding, and the latter was electrically and mechanically connected with the same silver paste as used for the electrode layer. Thereafter, the assembly was transfer-molded with an epoxy resin with a part of the lead frame remaining, and the prescribed portion of the lead frame outside the mold was cut and then bent along the outer package to form an external terminal, whereby a chip solid electrolytic capacitor having a dimension of 7.3×4.3×1.8 mm was produced. Subsequently, the capacitor was aged at 125° C. and 7 V for 3 hours and then passed through a tunnel furnace having a peak temperature of 270° C. and a region at 230° C. for 35 seconds, so as to obtain a final chip solid electrolytic capacitor.

Comparative Example 1

A chip solid electrolytic capacitor was produced in the same manner as in Example 1 except that the conductor having the dielectric layer formed thereon was not impregnated with a dopant.

Example 4

A chip solid electrolytic capacitor was produced in the same manner as in Example 1 except that the electrolytic polymerization was carried out in a bath having a mixed solution of 30% by mass ethylene glycol and water which solution contained 4% naphthalene-2-sulfonic acid dissolved therein instead of 4% anthraquinone-2-sulfonic acid.

Comparative Example 2

A chip solid electrolytic capacitor was produced in the same manner as in Example 4 except that the conductor having the dielectric layer formed thereon was not impregnated with a dopant.

Examples 5 to 8

A tantalum sintered body having a CV value (which is a product of the capacitance and the chemical conversion voltage) of 150,000 µF·V/g (dimension: 4.4×1.0×3.0 mm, mass: 82 mg, having a lead wire made of tantalum having a diameter of 0.40 mm with 10 mm of the lead appearing from the surface) was used as a conductor. A washer made of polytetrafluoroethylene was attached to the lead wire for the purpose of preventing a solution from splashing up onto the lead in the later step of forming a semiconductor layer.

The sintered body to work as an anode, except for a part of the lead wire, was immersed in a 1% by mass anthraquinone-2-sulfonic acid aqueous solution, and chemical conversion was carried out at 65° C. for 7 hours while applying a voltage of 10 V between the sintered body and a tantalum plate electrode as a cathode, so as to form a dielectric material oxide film layer formed of $Ta_2O_5$. The sintered body except for the lead wire was immersed in an alcohol (ethanol) solution containing the compounds shown in Table 1 as a dopant dissolved therein, and then dried to remove the alcohol. The impregnation with the dopant and the removal of the alcohol were repeated 5 times.

The sintered body except for the lead wire was then immersed in a bath (a tantalum foil was attached to the lower part of the polypropylene bath to function as an external electrode) having therein a separately provided mixed solution of 30% by mass ethylene glycol and water which solution contained 3,4-ethylenedioxythiophene monomer in such a sufficient amount that some of the amount remained undissolved and 4% anthraquinone-2-sulfonic acid, and electrolytic polymerization was carried out at 120 μA for 60 minutes with the lead wire of the sintered body used as an anode and the external electrode used as a cathode. The sintered body was pulled up from the bath, and after rinsing with water, rinsing with an alcohol and drying, the sintered body was subjected to follow-up chemical conversion in a 1% by mass anthraquinone-2-sulfonic acid aqueous solution at 65° C. and 7 V for 15 minutes. The electrolytic polymerization and the follow-up chemical conversion were repeated 6 times to form a semiconductor layer constituted of a polythiophene derivative on the dielectric layer.

Subsequently, electrode layer was formed on the semiconductor layer in the same manner as in Example 1, and the assembly was sealed with an epoxy resin to produce a chip solid electrolytic capacitor. Subsequently, the capacitor was aged at 135° C. and 3 V for 3 hours, and then allowed to stand in a furnace at 185° C. for 15 minutes to cure the outer package resin, so as to obtain a chip solid electrolytic capacitor as final product.

Comparative Example 3

A chip solid electrolytic capacitor was produced in the same manner as in Example 5 except that the conductor having the dielectric layer formed thereon was not impregnated with a dopant.

Example 9

A solid electrolytic capacitor was produced in the same manner as in Example 5 except that the size and mass of the sintered body was 4.4×3.0×3.0 mm and 245 mg respectively and that the size of the chip solid electrolytic capacitor was 7.3×4.3×3.8 mm.

Comparative Example 4

A chip solid electrolytic capacitor was produced in the same manner as in Example 9 except that the conductor having the dielectric layer formed thereon was not impregnated with a dopant.

The performances of the chip solid electrolytic capacitors produced in Examples 1 to 9 and Comparative Examples 1 to 4 measured in the following manner are shown in Table 2. The data shown in Table 2 were average values of 30 pieces of capacitors.

Capacitance: It was measured by using an LCR measuring apparatus produced by Hewlett-Packard Co. at room temperature and 120 Hz.

ESR: The equivalent series resistance of the capacitor was measured at 100 kHz.

LC: It was measured at a rated voltage of 4 V for Examples 1 to 4 and Comparative Examples 1 and 2 and at a rated voltage of 2.5 V for Examples 5 to 9 and Comparative Example 4, at room temperature for 30 seconds.

TABLE 1

| Example | Dopant used for impregnation before forming semiconductor |
|---|---|
| 1 | 5% anthraquinone-2-sulfonic acid |
| 2 | mixture of 3% toluenesulfonic acid and 2% benzoquinonesulfonic acid |

TABLE 1-continued

| Example | Dopant used for impregnation before forming semiconductor |
|---|---|
| 3 | 5% iron naphthalene-2-sulfonate |
| 4 | 5% anthraquinone-2-sulfonic acid |
| 5 | 5% anthraquinone-2-sulfonic acid |
| 6 | mixture of 3% toluenesulfonic acid and 2% benzoquinonesulfonic acid |
| 7 | 5% iron naphthalene-2-sulfonate |
| 8 | 1% ammonium borodisalicylate |
| 9 | 20% iron ethylbenzene sulfonate aqueous solution |

TABLE 2

| | | Capacitance (μF) | ESR (mΩ) | LC (μA) |
|---|---|---|---|---|
| Example | 1 | 708 | 7 | 21 |
| | 2 | 701 | 8 | 33 |
| | 3 | 688 | 9 | 30 |
| | 4 | 715 | 9 | 26 |
| | 5 | 965 | 10 | 49 |
| | 6 | 970 | 11 | 52 |
| | 7 | 958 | 10 | 63 |
| | 8 | 952 | 11 | 56 |
| | 9 | 2800 | 7 | 125 |
| Comparative Example | 1 | 653 | 22 | 24 |
| | 2 | 648 | 22 | 29 |
| | 3 | 830 | 18 | 55 |
| | 4 | 2010 | 39 | 143 |

It is understood from the comparison between Examples 1 to 9 and Comparative Examples 1 to 4 that when a semiconductor layer is produced on a conductor impregnated with a dopant after forming a dielectric layer by an electrification method, a solid electrolytic capacitor thus produced has a high capacitance and a favorable ESR value.

What is claimed is:

1. A process for producing a solid electrolytic capacitor element, comprising forming a semiconductor layer containing a conductive polymer on a conductor having a dielectric layer on its surface, next impregnating the conductor with a dopant and, after the conductor is impregnated with the dopant, forming a semiconductor layer on the doped conductor having a dielectric layer on its surface by an electrification method.

2. The process for producing a solid electrolytic capacitor element as claimed in claim 1, wherein the dopant is an electron donating compound providing, upon doping through electrolytic polymerization, a conductive polymer having a conductivity of from $10^{-1}$ to $10^3$ S·cm$^{-1}$.

3. The process for producing a solid electrolytic capacitor element as claimed in claim 1, wherein the dopant is at least one selected from a compound having a sulfuric acid group and a boron compound having a carboxylic acid coordinated to a boron atom.

4. The process for producing a solid electrolytic capacitor element as claimed in claim 1, wherein the conductor is a metal containing as a major component at least one selected from tantalum, niobium, titanium and aluminum, niobium oxide, or a mixture of two or more thereof.

5. The process for producing a solid electrolytic capacitor element as claimed in claim 1, wherein the semiconductor layer is a layer comprising at least one selected from a semiconductor containing as a major component a conductive polymer obtained by doping a polymer containing a repeating unit represented by formula (1) or (2) with a dopant:

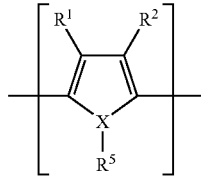
(1)

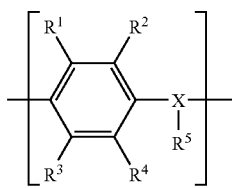
(2)

wherein $R^1$ to $R^4$ each independently represent a hydrogen atom, an alkyl group having from 1 to 6 carbon atoms or an alkoxy group having from 1 to 6 carbon atoms; X represents an oxygen atom, a sulfur atom or a nitrogen atom; and $R^5$, which exists only when X is a nitrogen atom, represents a hydrogen atom or an alkyl group having from 1 to 6 carbon atoms, provided that $R^1$ and $R^2$, and $R^3$ and $R^4$ each may be bonded to form a ring.

6. The process for producing a solid electrolytic capacitor element as claimed in claim 5, wherein the polymer containing a repeating unit represented by formula (1) is a polymer containing a structural unit represented by formula (3) as a repeating unit:

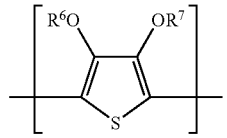
(3)

wherein $R^6$ and $R^7$ each independently represent a hydrogen atom, a linear or branched and saturated or unsaturated alkyl group having from 1 to 6 carbon atoms, or a substituent having at least one 5- to 7-membered saturated hydrocarbon ring structure containing two oxygen atoms formed by bonding the alkyl groups at an arbitrary position, provided that the ring structure encompasses a structure having a vinylene bond, which may be substituted, and a phenylene structure, which may be substituted.

7. The process for producing a solid electrolytic capacitor element as claimed in claim 5, wherein the conductive polymer is selected from polyaniline, polyoxyphenylene, polyphenylene sulfide, polythiophene, polyfuran, polypyrrole, polymethylpyrrole and substituted derivatives and copolymers thereof.

8. The process for producing a solid electrolytic capacitor element as claimed in claim 7, wherein the conductive polymer is poly(3,4-ethylenedioxythiophene).

9. The process for producing a solid electrolytic capacitor element as claimed in claim 5, wherein the semiconductor has a conductivity in a range of from $10^{-2}$ to $10^3$ S·cm$^{-1}$.

10. A solid electrolytic capacitor element produced by the production process described in claim 1.

11. A solid electrolytic capacitor obtained by sealing the solid electrolytic capacitor element described in claim 10.

12. An electronic circuit comprising the solid electrolytic capacitor described in claim 11 used therein.

13. An electronic equipment comprising the solid electrolytic capacitor described in claim 11 mounted therein.

\* \* \* \* \*